United States Patent [19]
Lateur et al.

[11] Patent Number: 5,823,280
[45] Date of Patent: Oct. 20, 1998

[54] HYBRID PARALLEL ELECTRIC VEHICLE

[75] Inventors: Michel J. Lateur, Redwood City; Daniel P. Pliskin, Palo Alto, both of Calif.

[73] Assignee: Nevcor, Inc., Stanford, Calif.

[21] Appl. No.: 372,173

[22] Filed: Jan. 12, 1995

[51] Int. Cl.$^6$ .................................................. B60K 1/00
[52] U.S. Cl. ........................ 180/65.2; 180/65.4; 180/165
[58] Field of Search .................. 60/716; 180/65.2, 180/65.1, 65.4, 65.3; 475/3, 5; 364/426.041; 318/141, 149, 34, 41, 46, 53, 59, 61

[56] References Cited

U.S. PATENT DOCUMENTS

| | | | |
|---|---|---|---|
| 3,122,696 | 2/1964 | Graybeal et al. | 322/20 |
| 3,566,717 | 3/1971 | Berman et al. | 74/859 |
| 4,155,019 | 5/1979 | Weghaupt | 310/61 |
| 4,187,436 | 2/1980 | Etienne | 290/27 |
| 4,407,132 | 10/1983 | Kawakatsu et al. | 60/716 |
| 5,067,932 | 11/1991 | Edwards | 475/5 |
| 5,365,153 | 11/1994 | Fujita et al. | 318/34 |

*Primary Examiner*—Richard M. Camby
*Attorney, Agent, or Firm*—Flehr Hohbach Test Albritton & Herbert LLP

[57] ABSTRACT

A hybrid electric drive system is described that includes a heat engine having a drive shaft, and two electric motor/generators having rotors that are coaxially connected to the drive shaft. A control arrangement for these elements is also described that provides a relatively simple combined operation for driving a vehicle.

19 Claims, 9 Drawing Sheets

HYBRID PARALLEL ELECTRIC VEHICLE

TECHNICAL FIELD

The invention relates generally to electric vehicles, and drive arrangements which include both a fuel powered engine and a pair of coaxial electric motor/generators.

PRIOR ART

Most of today's motor vehicle carry an internal combustion engine that functions optimally at high speeds only. It is by necessity larger than an engine required for "in town" operation. Therefore a penalty is paid for the luxury of broad range operation, including the deterioration of our environment. Emissions during warm-up and low speed operations are not negligible. A large engine requires longer warm-up time, and short trips may not achieve warm-up in many cases, increasing the pollution problem.

There exists, at the moment, much effort in addressing the basic need for an efficient power source at all operating conditions. One such effort, known as series hybrid electric, approaches the problem by carrying an on-board generator, which supplies electrical power to recharge batteries for an electric drive mechanism. This allows for "range extending" at the cost of the additional weight of added components. In this scheme each of the power elements must be individually capable of the peak demands of the vehicle. An example of a series hybrid electric vehicle is set forth in U.S. Pat. No. 4,187,436, issued Feb. 5, 1980 to Etienne.

Another effort, known as parallel hybrid electric, holds a significant amount of promise. A parallel system allows the output from power components to be added together as required and therefore, each of the power components need only produce a portion of the power required of the series system components. Similarly, each of the power components is substantially lighter than its counterpart in the series hybrid. This reduction in weight also reduces power requirements, necessitating fewer batteries for the same range.

One such parallel hybrid electric system is described in U.S. Pat. No. 4,407,132 issued Oct. 4, 1983 to Kawakatsu et al. This particular arrangement, however, is not without disadvantages. For example, the rotational speed of the rotor of the single electric motor generator must always rotate at a multiple of the speed of the drive shaft which will result in the motor stopping its rotation whenever the drive shaft stops. If the rotor of the motor/generator turns at substantially the same speed as the drive shaft, such motor/generator will not operate as efficiently as possible since electric motors/generators operate most efficiently when rotating at relatively high speeds. When the motor/generator is converting electrical energy to mechanical rotation of the shaft, at low speeds, the torque must be high in order to reach high mechanical power outputs. Since torque is proportional to current, this leads to large $I^2R$ losses and increased degradation of the electric storage device.

If the drive shaft is maintained at high speeds, though, a transmission is required to transform the high drive shaft speed to a lower speed to be applied to the differential. A clutch is also needed to disengage the drive shaft from the transmission. The addition of the clutch and transmission necessarily adds weight and complexity to the drive system.

Another parallel arrangement is set forth in U.S. Pat. No. 3,566,717 issued Mar. 2, 1971 to Berman et al. While this system eliminates some of the problems associated with the Kawakatsu arrangement, the Berman et al. arrangement also has a number of shortcomings. For example, since the motor/generators are not disposed coaxially with the output shaft from the internal combustion engine, substantially more space is utilized than would otherwise be required. Also, additional support structures must be added and more bearings are required. There are no provisions made, moreover, for disengaging the internal combustion engine so the system can run in an all electric mode, the most environmentally sound mode.

In most hybrid electric vehicle motors, an internal combustion engine is used to run the generator to produce electricity. If the exhaust emissions from the engine when it is operating are maintained at ultra low levels, the actual average emissions from the vehicle can be maintained close to zero since the engine will be rarely used, i.e., only during relatively lengthy trips in which the batteries are significantly discharged. The internal combustion engine can be operated inherently cleaner by being maintained at a constant speed and constant load, independent of the time-varying need for road horsepower. During most city driving it will not operate at all, i.e., the hybrid electric vehicle will operate in an all-electric mode and be recharged at night by plugging the batteries into a standard 120V or 240V electrical outlet.

Hybrid electric vehicles have substantially different average power levels in many driving situations. For example, the average power consumed when operating "in-town" is substantially less than the average power consumed when operating at full highway speed. Similarly, substantially more power is consumed when climbing an extended grade, such as in the mountains, than is required when travelling on level highways. Thus to provide an electric generating system capable of charging the vehicle batteries in all travel situations would require operating the generating system at a higher, and potentially less efficient, power level than would be required for typical driving conditions.

SUMMARY OF THE INVENTION

The invention avoids the disadvantages of known parallel hybrid electric vehicles. In its broad aspects, it includes providing a pair of motor/generators (converters) whose rotors are coaxial with the ultimate drive shaft of, for example, the ground vehicle to be powered. A source of electrical energy, e.g., a battery pack, is also included. It has been found that the coaxial relationship of the converter rotors with the drive shaft results in a driving arrangement that is quite compact and is easily usable to electrically drive most ground vehicles.

Most desirably, both converters are also generators, i.e., capable of changing mechanical energy to electrical energy, as well as changing electrical energy to mechanical energy (from the broad standpoint, the term "generator" encompasses alternators), and the source includes a heat engine. The output shaft of the heat engine is connected to the generator-converter to provide the mechanical energy the latter needs to produce electricity for the driving arrangement. Again, the combination is quite compact. To enhance such compactness, it is most desirable that the heat engine output shaft also be coaxial with the ultimate drive shaft and, hence, with the converter rotors.

The invention includes many features and advantages, some of which are claimed, that will become apparent from a more detailed study of the drawings and the following description.

BRIEF DESCRIPTION OF THE DRAWINGS

For a better understanding of the present invention, reference may be made to the accompanying drawings, in which.

DETAILED DESCRIPTION

Figure 1:
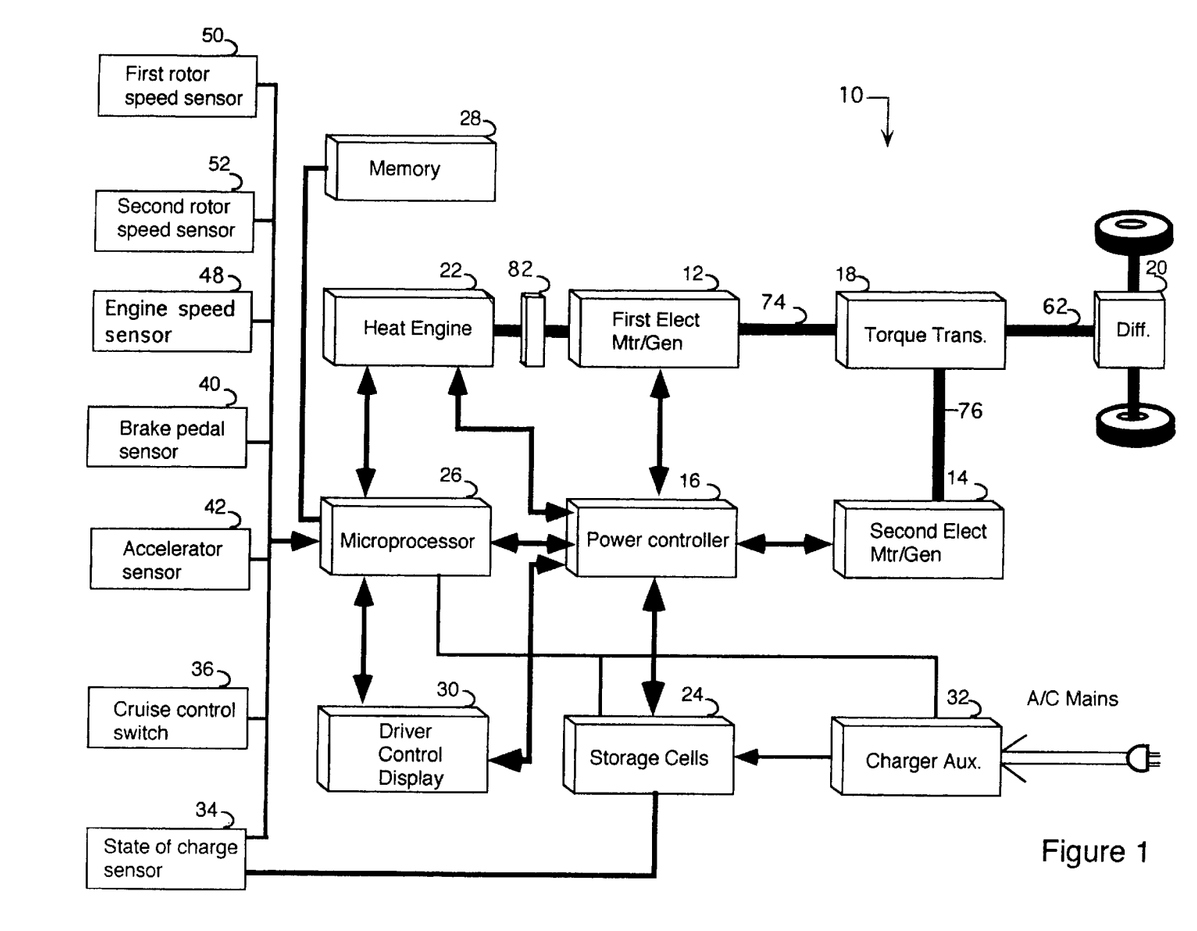
FIG. 1 is a block diagram of the major components of an embodiment of the present invention.

An embodiment of a hybrid electric drive arrangement of the invention is shown in FIG. 1. For simplicity in showing, the various elements are not shown in their physical relationships. This implementation of the invention can be used to power an automobile, truck, bus, delivery van, work vehicle, etc.

First and second motor/generators represented at 12,14 are electrically connected to a power controller represented at 16. In the preferred embodiment, the first and second motor/generators 12,14 are multi-pole, direct current, permanent magnet motors; however, it should be appreciated that other types of motors may be used, for example multiphase alternating current motors. Advantageously, the first and second motor/generators 12,14 are selected to have low mass rotors for high speed response, minimum cogging and high torque. The windings of the first and second motor/generators 12,14 are such that series-parallel combinations can be switched, and the commutation of the motor/generators can be controlled by the power controller 16 in a manner well-known in the art. Advantageously, the power controller 16 includes a plurality of power semiconductor switching devices, for example power MOSFETs or IGBTs.

First and second motor/generators 12,14 are coupled via planetary gear system 18 (described in detail below) to the vehicle's drive transmission 20 through which forces from the planetary gear system are transferred to the drive wheels of the vehicle, and vice versa.

Heat engine 22 includes a drive shaft 78 (FIG. 2) coupled via clutch 82 to the first motor/generator 12 for driving the latter at a speed and load sufficient to produce an output voltage capable of recharging an electric power storage device 24, such as a plurality of batteries, via power controller 16. In a preferred implementation, heat engine 22 is a rotary engine of a type well-known in the art; however, it will be appreciated by those skilled in the art that four-stroke engines, two-stroke engines, gas turbines and the like may be used. In the embodiment being described, heat engine 22 is fuel injected and is controlled via microprocessor 26 to operate at its maximum efficiency.

Microprocessor 26 serves to process a plurality of control algorithms for controlling operation of the hybrid electric drive system in response to a plurality of sensed parameters. A memory device 28 is coupled to microprocessor 26 for storing sensed parameters, limit values, and various flags used in operation of the control algorithms, as well as, in one implementation, the instructions for carrying out the algorithms. In this embodiment, power controller 16, microprocessor 26, and memory device 28 are powered by the electric storage device 24, and appropriate isolation and voltage regulation circuitry is utilized to provide the appropriate power level and regulation to those devices.

An operator display 30 is coupled to microprocessor 26 for receiving signals representative of operating conditions and the levels of sensed parameters. Charger unit 32 is connected to the electric power storage device 24 and includes a power inlet cord allowing charger unit 32 to be connected to an external power source, such as a 120 or 240 volt AC line. Charger unit 32 converts, if necessary, the external power signal to an appropriate DC level and delivers the electrical energy to electrical storage device 24 for recharging. For example, when the operator returns the vehicle to a fixed location having a standard electrical outlet, electrical storage device 24 can be recharged by plugging charger unit 32 into a standard AC electrical outlet, with charger unit 32 rectifying the AC power to provide a DC charging voltage.

A state of charge sensor 34 of a type well-known in the art and is provided for sensing the state of charge of the electric power storage device 24 and delivering an appropriate signal to the microprocessor 26.

A plurality of switch inputs are provided within the operator compartment of the vehicle to allow the operator to control the drive system 10. A speed "cruise" control switch 36 is one of them. It is provided for producing a "cruise control on" signal or a "cruise control off" signal in response to a selection made by the operator. Similarly, in one embodiment, trip parameter inputs 38 are provided to allow the operator to modify operation of the control algorithms by transmitting information regarding the characteristics of the trip to be undertaken to microprocessor 26. For example, information pertaining to the length of the trip, whether there is a downhill portion near the end of the trip, whether the trip is predominated by "in-town" driving, etc., can be inputted.

Similarly, brake pedal and accelerator sensors 40,42 of types typically found in automobiles are included connected, respectively, with the brake pedal and accelerator pedals. Such sensors 40,42 produce signals indicative of the relative displacement of the brake pedal and accelerator, respectively, and deliver them to microprocessor 26. A plurality of rotational speed sensors 48,50,52 are also provided. They are included for indicating the rotational speed of the output shaft 62 (related by gear ratio to the drive motors), and the rotors of the first and second motor/generators 12,14.

Figure 2:
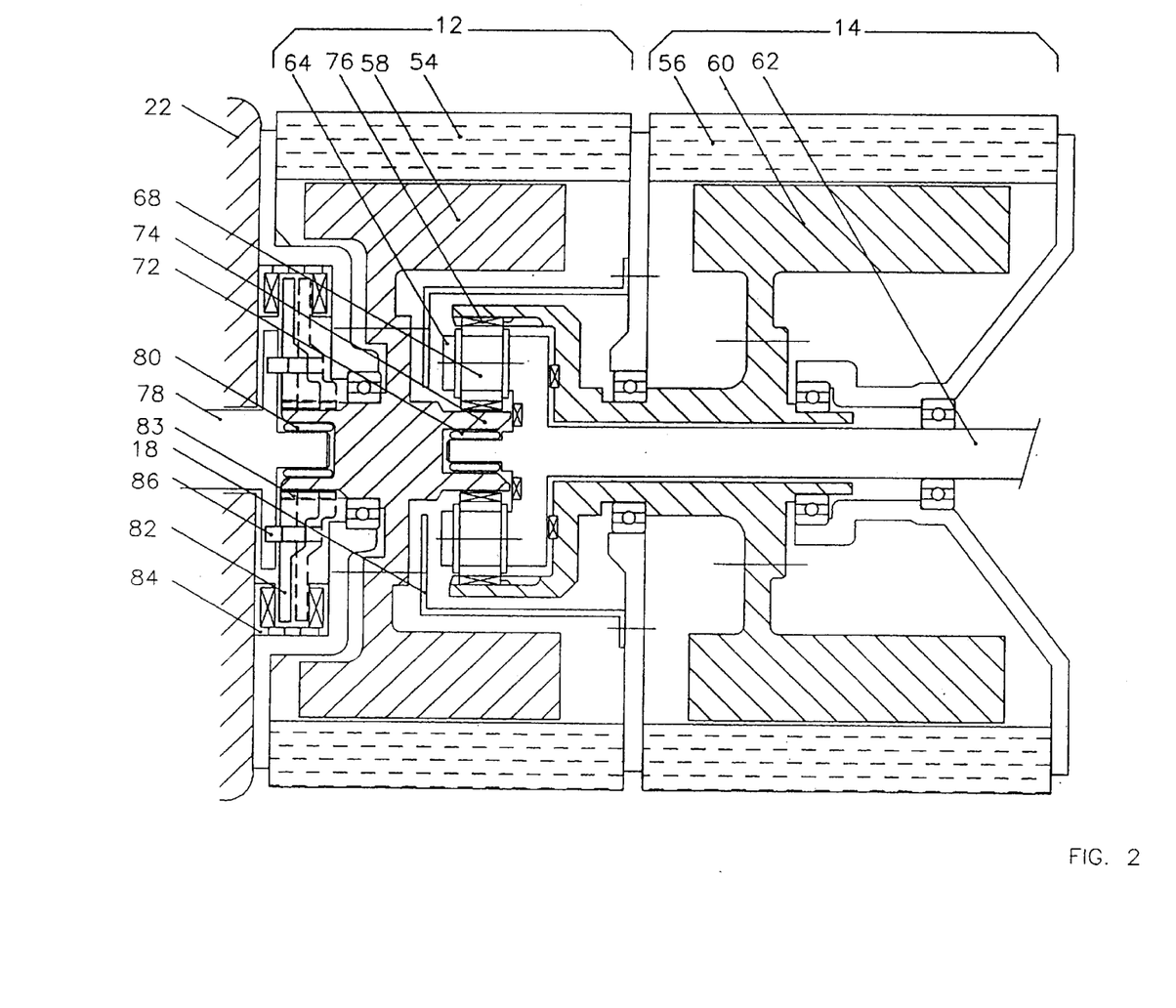
FIG. 2 is a cut-away, side view of one embodiment of a parallel hybrid electric drive arrangement incorporating the invention.
Figure 3:
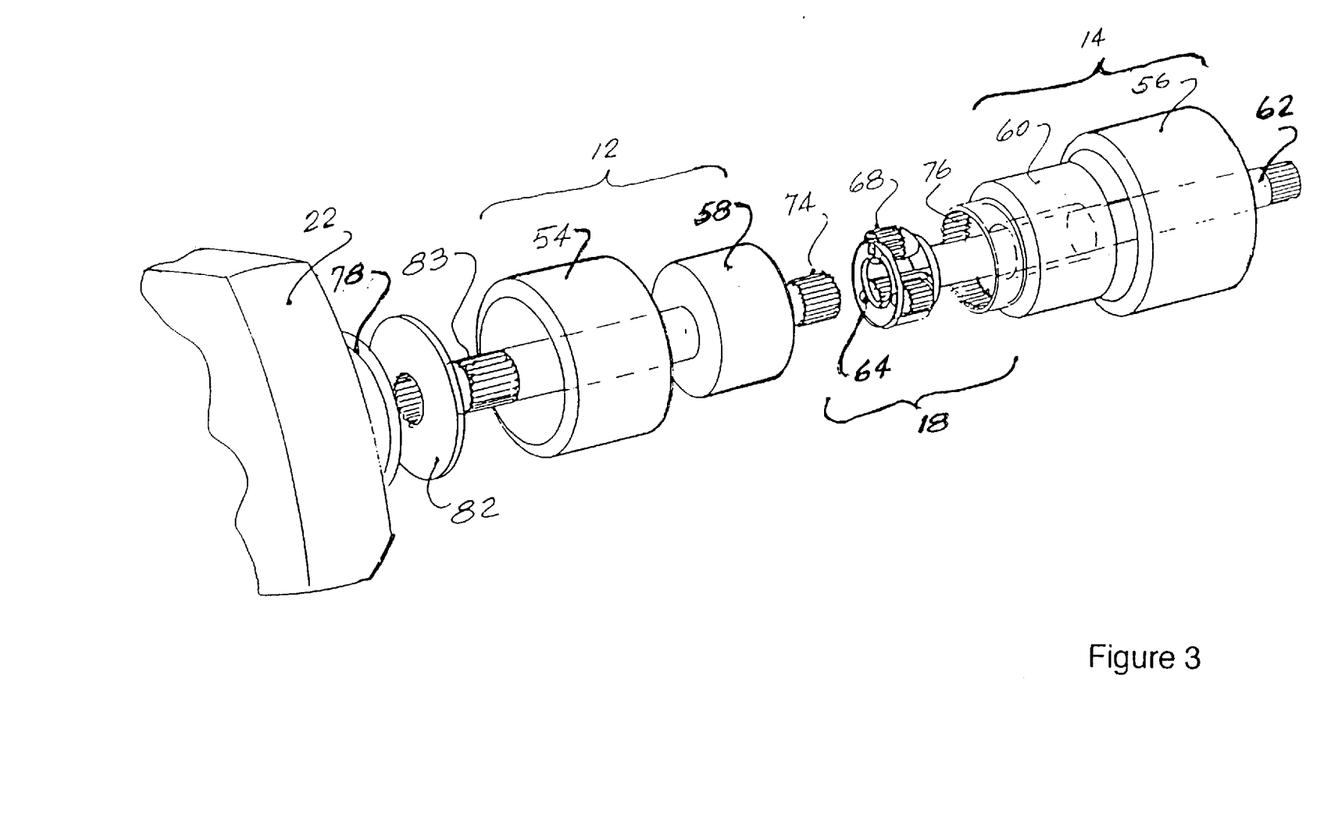
FIG. 3 is an exploded, isometric view of the embodiment of FIG. 2.

Referring now primarily to FIG. 2 and FIG. 3, the first and second motor/generators are shown and include first and second stators 54,56, and first and second rotors 58,60, respectively. In one implementation of the invention, first and second rotors 58,60 each include a plurality of permanent magnets; however, as described above other types of motors may be used.

Output shaft 62 includes a plurality of spindles 64 at its end within the torque transmission. A plurality of planet gears 68 are rotatably mounted to the spindles 64. (In the design shown, four planet gears 68 and four spindles 64 are used.) Output shaft 62 is axially aligned and constrained to the first rotor 58 via a first set of needle bearings 72.

The first rotor 58 includes a sun gear 74 in engagement with the planet gears 68. On the other hand, the second rotor 60 includes a ring gear 76 engaged with such planet gears. By virtue of this arrangement, the rotational speed of output shaft 62 is dependent upon the difference between the rotational speeds of the first and second rotors 58 and 60. It may be manually input by the operator, or the hybrid electric drive system 10 may be controlled in a completely automatic mode and require no upgrade or input. For example, if the circumference of ring gear 76 is three times the circumference of sun gear 74, then where first rotor 58 is spinning at 3000 RPM in the clockwise direction and second rotor 60 is spinning at 1000 RPM in the counterclockwise direction, output shaft 62 will remain stationary. Similarly, when the first rotor 58 is rotating at 3000 RPM in the clockwise direction and the second rotor 60 is not rotating, output shaft 62 will rotate at 1000 RPM in the clockwise direction.

The first rotor 58 is coaxially aligned with output shaft 78 of heat engine 22 via a second set of needle bearings 80. In accordance with the invention, shafts 78 and 62, and first and second rotors 58,60 are disposed along substantially the same axis of rotation. And because of the planet gear arrangement, it can be said that both of the motor/generators have output shafts which are coaxial with the drive shaft.

Clutch 82 is connected to first rotor 58 via spline 83 and is movable between engaged and disengaged positions. When engaged, clutch 82 is coupled to both first rotor 58 and output shaft 78 such that first rotor 58 and the output shaft 78 rotate at the same speed. When in the disengaged position, clutch 82 remains engaged with first rotor 58 but is not in contact with the output shaft 78. Thus output shaft 78 and first rotor 58 are allowed to rotate independently. Clutch 82 may be moved between the engaged and disengaged positions by a solenoid coil 84 as shown which receives control signals from microprocessor 26. Detent mechanism 85, for example, of a type well-known in the art, is included for maintaining clutch 82 in the engaged or disengaged positions without further expenditure of electrical energy by solenoid coil 84. While only a simple form of clutch 82 with extended pins 86 is shown engaged in bores in the flange of output shaft 78, it should be apparent that many variations of clutch 82 will be suitable.

Figure 4:
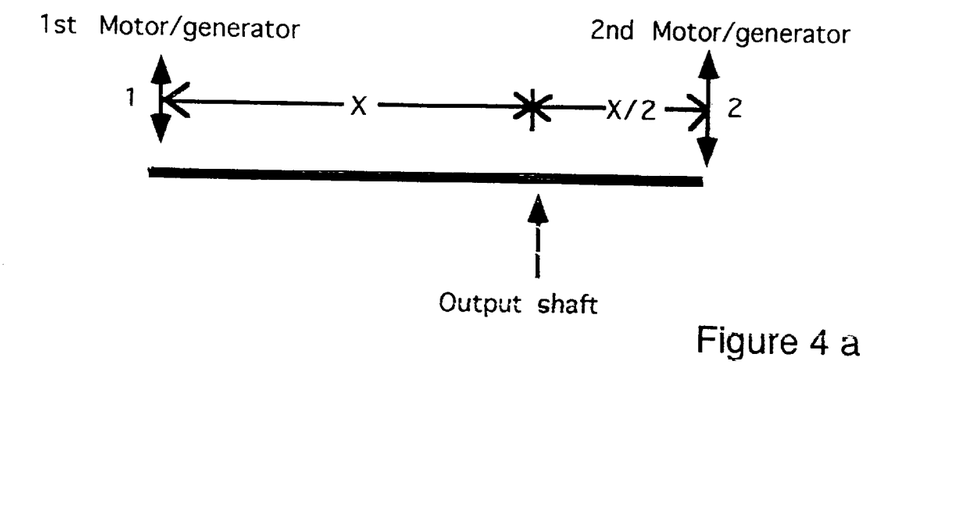
FIGS. 4a and 4b illustrate the torque distribution of a hybrid electric drive arrangement of the invention.

The torque applied to output shaft 62 and, hence, to the automobile differential, is directly related to the torque of the first and second rotors 58,60. This output torque when the system is operated in an all-electric mode, i.e., with clutch 82 (FIG. 2) disengaged and both the first and second motor/generators 12,14 driving the output shaft 62, is equal in this embodiment to X times the torque of the first rotor 58 plus X/2 times the torque of second rotor 60, where X is equal to the gear reduction to output shaft 62 of sun gear 74. The actual gear reduction chosen is a matter of design choice and depends upon the desired performance characteristics of the drive system. One of ordinary skill in the art easily can choose an appropriate gear reduction to provide selected characteristics. In general, the power ($\omega_C \tau_C$) is equal to $\omega_A(\tau_A+\tau_E)+\omega_B\tau_B$, where:

ω=rotational speed;
τ=torque;
A represents the first rotor;
B represents the second rotor;
E=the heat engine; and
C=the output shaft 62;

FIGS. 4a and 4b are force diagrams which show the relationships. FIG. 4a shows the relationships when the drive arrangement of the invention is in an all-electric mode, whereas FIG. 4b shows the relationships when the heat engine is part of such arrangement.

Recharge Mode

The torque characteristics of the drive system when the clutch 82 is engaged and motor/generator 12 is being used as a generator are now discussed. (This is known as the recharge mode.) In this case, the torque on the output shaft 62 is equal to the sum of X/2 times the torque of the second rotor 60 plus X times the difference of the torque of output shaft 78, less the torque absorbed by the first rotor 58 (the generative load). Thus the difference of torque from the combination of the first rotor and the engine acts to drive the output shaft 62.

In the exemplary embodiment of FIG. 2, the torque of the first rotor 58 times the gear reduction of sun gear 74 equals the torque of second rotor 60 times the gear reduction of ring gear 76. This is necessary to balance the torques applied to output shaft 62 to prevent one source of torque from overdriving the other. In addition, it is desirable to maintain the currents flowing in both of the motor/generators 12,14 at relatively low levels. Since torque is proportional to current, the current in each motor/generator is minimized by causing each of motor/generators 12,14 to produce one-half of the torque required at output shaft 62. Since torque is proportional to current, it is advantageous to keep the current flowing in the first motor/generator 12 multiplied by the gear reduction of sun gear 74, substantially equal to the current flowing in second motor/generator 14 multiplied by the gear reduction of ring gear 76. Thus, by causing both electric motor/generators 12,14 to drive output shaft 62, losses are minimized and the lifespan of electric power storage device 24 is improved. Thus, in one embodiment, the maximum torque available is equal to twice the torque of the least torque producing element.

First and second motor/generators 12,14 are preferably operated at relatively high speeds. Since back electromotive force (EMF) increases in proportion to rotational speed, by maintaining the rotational speed of first and second rotors 58, 60 at relatively high levels, currents are maintained at lower levels and voltages are maintained at relatively high levels. By minimizing currents, the lifespan of electric power storage device 24 is improved and the $I^2R$ losses are minimized. In addition, the control of the voltages by power controller 16 is improved when the voltages of the motor/generators are relatively high since a smaller proportion of the voltage is dissipated across the switching devices within power controller 16.

As is well-known in the art of electric motors, for any given rotor speed there is a current-load relationship in which the speed for a given current will increase as the load decreases, and vice versa. In addition, each rotor 58,60 has a maximum allowable speed and a maximum allowable current which is stored in memory device 28. Microprocessor 26 maintains rotors 58,60 within their allowable operating limits by comparing the operating characteristics of the motor/generators 12,14 with their respective operating limits.

All Electric Mode

Figure 5:
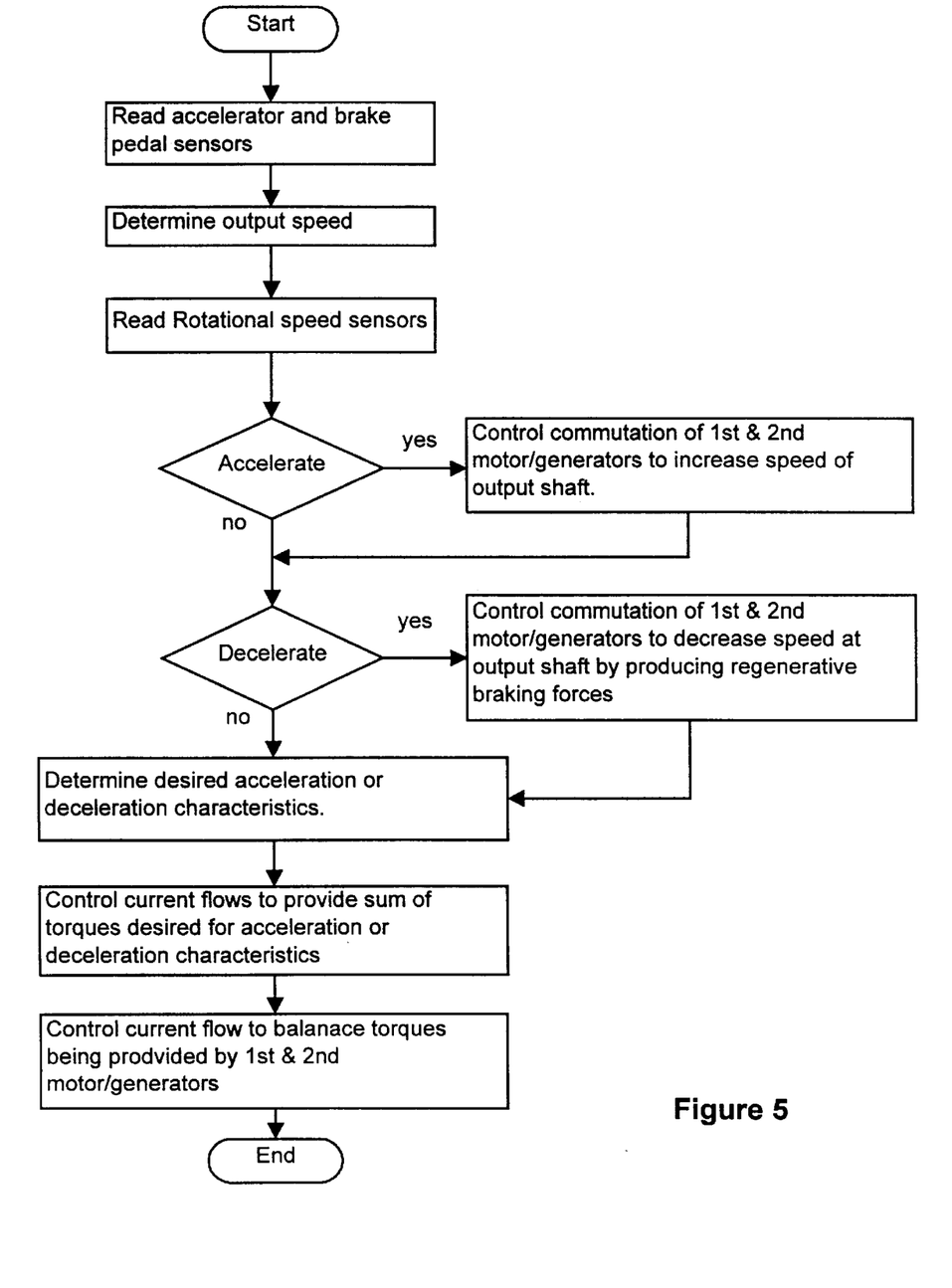
FIG. 5 is a logic flow chart illustrating an all-electric operation of an embodiment of the invention.

Referring now to FIG. 5, an exemplary flow chart showing operation in an all-electric mode is illustrated. Microprocessor 26 receives signals from brake pedal and accelerator sensors 40,42 and from the output shaft speed sensor 46 and responsively determines the desired output shaft speed and torque.

In one embodiment, memory device 28 includes a look-up table of a type well-known in the art for determining the desired speed and torque of output shaft 62. The desired speed and torque determined by microprocessor 26 is a function of the signals from the brake pedal and accelerator sensors 40, 42, the speed of the vehicle, and information stored in the memory device 28. The precise values included in the look-up table are determined in response to the desired operating characteristics of the vehicle and reflect, for example, desired acceleration and deceleration characteristics and operational limits of system components. Whenever acceleration is desired, power controller 16 changes the commutation of the motor/generators 12,14 as appropriate to increase torque and to change the relative rotational speed of the first and second rotors 58,60 to achieve a higher rotational speed for the output shaft 62. Similarly, whenever deceleration is desired, power controller 16 changes the commutation phasing of first and second motor/generators 12,14 to apply torque to output shaft 62 counter to its direction of rotation and to change the relative rotational speed of the first and second rotors 58,60 to achieve a lower rotational speed for output shaft 62.

The rotational speed of the output shaft 62 is a function of the difference between the rotational speeds of the rotors 58,60. The speed of rotor 60 increases (or the speed of rotor 58 decreases) as the demand for greater forward vehicle speed increases. To decrease the forward speed of the vehicle, the difference between the rotational speeds of the first and second rotors 58, 60 is decreased. The rate of acceleration and deceleration are determined in response to the signals from brake pedal and accelerator sensors 40,42. Microprocessor 26 receives the signals from brake pedal and accelerator sensors 40,42 and, by way of data reflecting the desired operating characteristics of the vehicle stored in a look-up table in memory device 28, responsively determines the desired change of relative rotation of the first and second rotors.

Microprocessor 26 processes the signals from the first and second rotor speed sensors 50,52 to determine whether the difference between the speeds of such rotors 58,60 is such that the rotational speed of the output shaft 62 is substantially equal to the desired output speed. If not, microprocessor 26 delivers a signal to power controller 16 to change the switching characteristics of power being delivered to the first and second motor/generators 12,14 so that the appropriate torque is applied to provide the appropriate acceleration or deceleration characteristic for the vehicle such that the rotational speeds of the first and second rotors 58,60 will change to cause output shaft 62 to rotate at the desired velocity.

Power controller 16 senses the amount of current flowing in each of motor/generators 12,14 and sends signals to microprocessor 26 indicative of the current levels in the motor/generators 12,14. Microprocessor 26 determines whether the currents in such motor/generators 12,14 will cause the sum of the torques being produced by the first and second motor/generators 12,14, multiplied by their respective gear reductions, to be substantially equal to the desired torque on output shaft 62. If not, microprocessor 26 sends a signal to power controller 16 to change appropriately the current in the first and second motor/generators 12,14.

Microprocessor 26 also determines whether the torques being produced by the motor/generators 12,14 multiplied by their respective gear reductions are substantially equal. Microprocessor 26 sends signals to power controller 16 to correct for any sensed torque imbalances by making the appropriate changes to the commutation of motor/generators 12,14.

Transition to Recharging Mode

Figure 6:
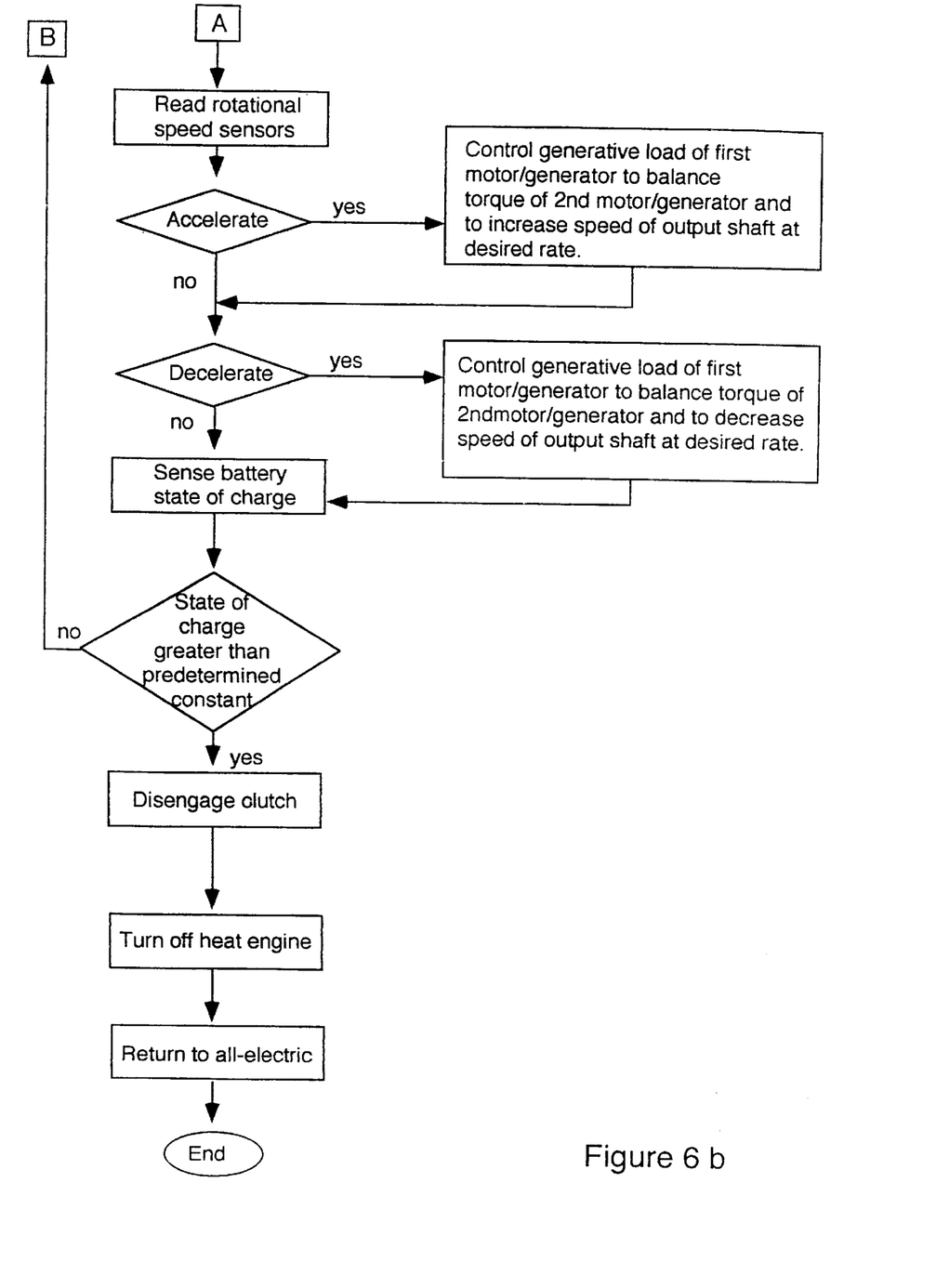
FIGS. 6a and 6b illustrate a logic flow chart of the transition portion of the operation.
Figure 6A:
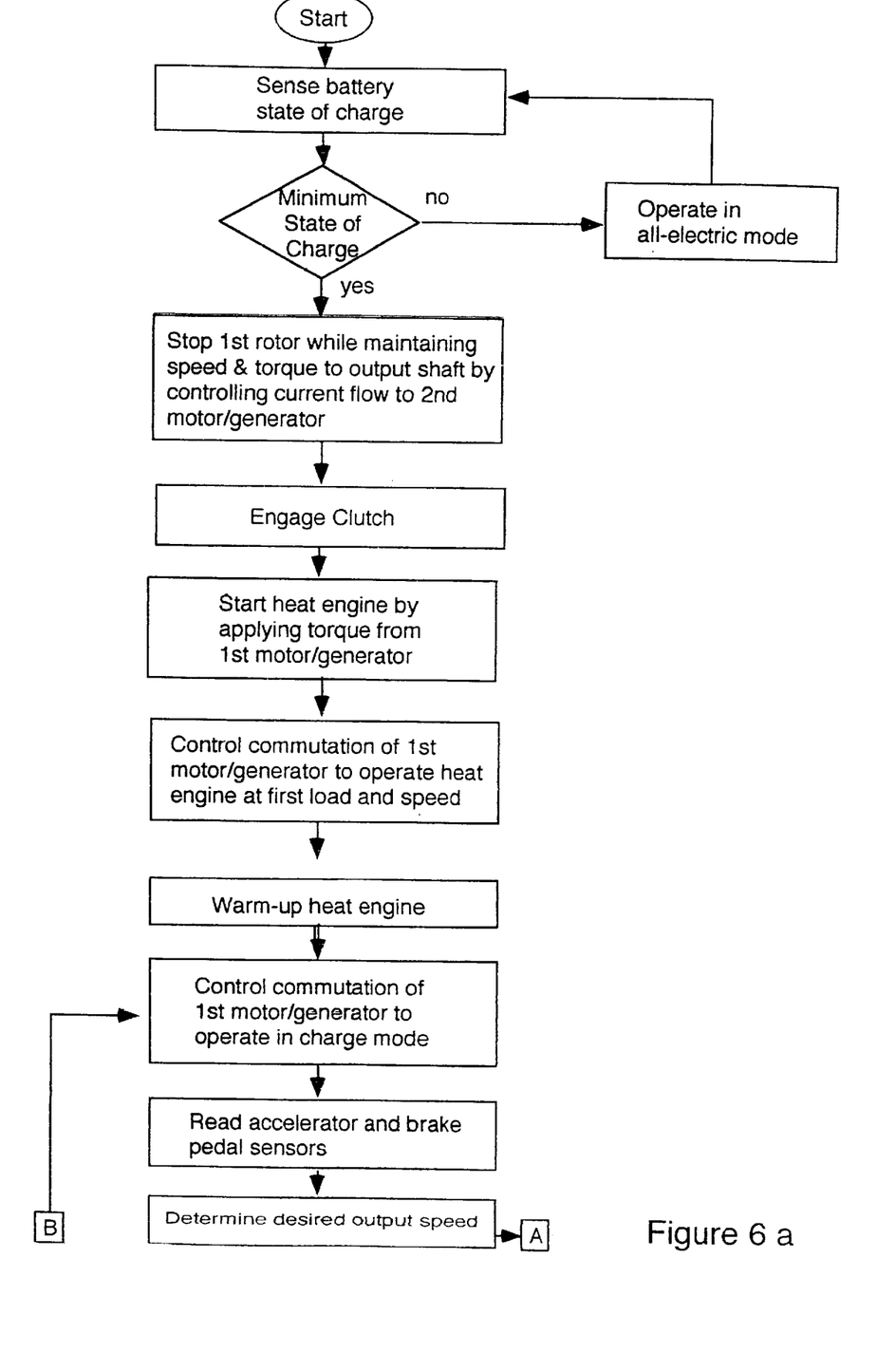

Referring now to FIGS. 6a and 6b, the transition from the all-electric mode to a recharging mode is illustrated. Microprocessor 26 receives a signal from state of charge sensor 34 indicating the state of charge of electric power storage device 24. If the state of charge is greater than a predetermined level, the system continues to operate in the all-electric mode.

The predetermined level selected, is based on the desired degree of discharge of electrical storage device 24 prior to recharge and, if desired, in response to the trip parameter inputs. For example, if there is a large downhill portion near the end of the trip which will be coming up shortly, the operator may direct microprocessor 26 to allow electrical storage device 24 to remain at a low state of charge to take full advantage of the upcoming regenerative braking described below. Similarly, if the vehicle is nearing the end of a trip, the operator may determine that it is better to wait to recharge electrical storage device 24 with charger unit 32. Thus, heat engine 22 is only used during trips in which electric storage device 24 does not store enough power for the entire journey.

When the state of charge is less than the predetermined level, microprocessor 26 brings first rotor 58 to a low speed or a stop so that clutch 82 can be engaged without significant slippage. As rotor 58 slows, the microprocessor 26 causes power controller to vary the speed and torque of the second rotor 60 to compensate for the decrease in speed of the first rotor 58. Thus, the desired speed and torque on output shaft 62 is maintained while first rotor 58 is slowing or stopping.

Once rotor 58 is at the same rotational speed as the engine drive shaft 78, microprocessor 26 sends a signal to solenoid coil 84 to engage clutch 82. Microprocessor 26 then sends a signal to power controller 16 to begin delivering electrical energy from the electrical storage device to motor/generator 12 in order to impart torque to drive shaft 78 via clutch 82. Microprocessor 26 then sends a signal to start heat engine 22. When, for example, heat engine 22 is a fuel injected engine, this signal might initiate fuel injection to thereby start the engine 22. Alternatively, this signal from microprocessor 26 might enable the ignition system of the heat engine 22.

When engine 22 starts, microprocessor 26 signals to power controller 16 to allow first rotor 58 to be driven at a constant load and a low, start-up, constant speed. During engine warm-up, reduced torque is absorbed by first rotor 58. The initial speed and torque of first rotor 58 are maintained by controlling the switching characteristics within power controller 16. Engine 22 continues to operate at this first load and speed as desired, e.g., either for a predetermined length of time, until it reaches a predetermined operating temperature, or until pollutants fall below a desired level. As is well-known to those skilled in the art, emissions are minimized by allowing the heat engine to warm-up prior to placing it under increased or full load.

After warm-up, the speed and load of the heat engine 22 and the first rotor 58 are increased to a preferred operating state. First rotor 58 is operated as a generator and current flows from the first stator via power controller 16 to electric storage device 24 and to second motor/generator 14. Heat engine 22 provides torque to both the first motor/generator 12 and to the output shaft 62. Even though the load on engine 22 is maintained constant, the amount of torque applied to output shaft 62 is varied by changing the generative load of the first motor/generator 12. Changes to the generative load of the first motor/generator are accomplished via power controller 16 by changing the commutation characteristics of the switching of power flowing to such motor/generator.

The operating speed and load are chosen such that the voltage produced by the first motor/generator 12 is greater than the voltage of the electric power storage device 24 and such that the heat engine operates at an efficient speed and load to minimize emissions. As is well-known in the art, heat engines have various operating efficiencies depending upon the speed and torque load applied to their drive shafts. For this invention, the operating speed and load are most desirably chosen to correspond to the most efficient operating condition of the engine while it still operates at a rotational speed sufficient for it (the first motor/generator 12) to produce a back EMF that is greater than the voltage of the electric storage device 24. In this way, when heat engine 22 is operating, emissions are held to the lowest level possible. Therefore, by operating the heat engine 22 at a constant load and speed, the emission controlling components, e.g. catalytic converters, can be selected to most effectively reduce the polluting components that are prevalent at that operating speed and load.

Alternatively, microprocessor 26 causes solenoid coil 84 to disengage clutch 82 after the engine is started to allow the drive system to operate in the all-electric mode until the engine reaches operating temperature. The rotational speeds of drive shaft 78 and first rotor 58 are synchronized after warm-up to enable the clutch 82 to reengage the same.

While heat engine 22 is driving first motor/generator 12 at an efficient speed and load, power controller 16 is controlling energy flow from electric power storage device 24 to second motor/generator 14 and is controlling the generative load of first motor/generator 22 such that output shaft 62 is driven at the desired speed and torque. For example, in the event maximum torque is desired, the microprocessor sends a signal to the power controller to operate the second motor/generator at its maximum torque and to change the commutation of the first motor/generator so that the speed and load as seen by the drive shaft 78 remain constant—the torque produced by the engine that is not absorbed by the first motor/generator balances the torque imparted to the output shaft 62 by the second motor/generator.

While electrical storage device 24 is being recharged by the first motor/generator 12, state of charge sensor 34 is continuing to deliver signals to microprocessor 26 indicative of the state of charge of electrical storage device 24. When the state of charge exceeds a predetermined level indicating that electrical storage device 24 is at a desired state of charge, microprocessor 26 sends a signal to solenoid coil 84 causing it to move clutch 82 to the disengaged position. Microprocessor 26 then sends a signal to turn off heat engine 22, for example by stopping fuel flow and/or disabling ignition. Hybrid electric drive system 10 then operates in the all-electric mode.

Speed Control

Figure 7:
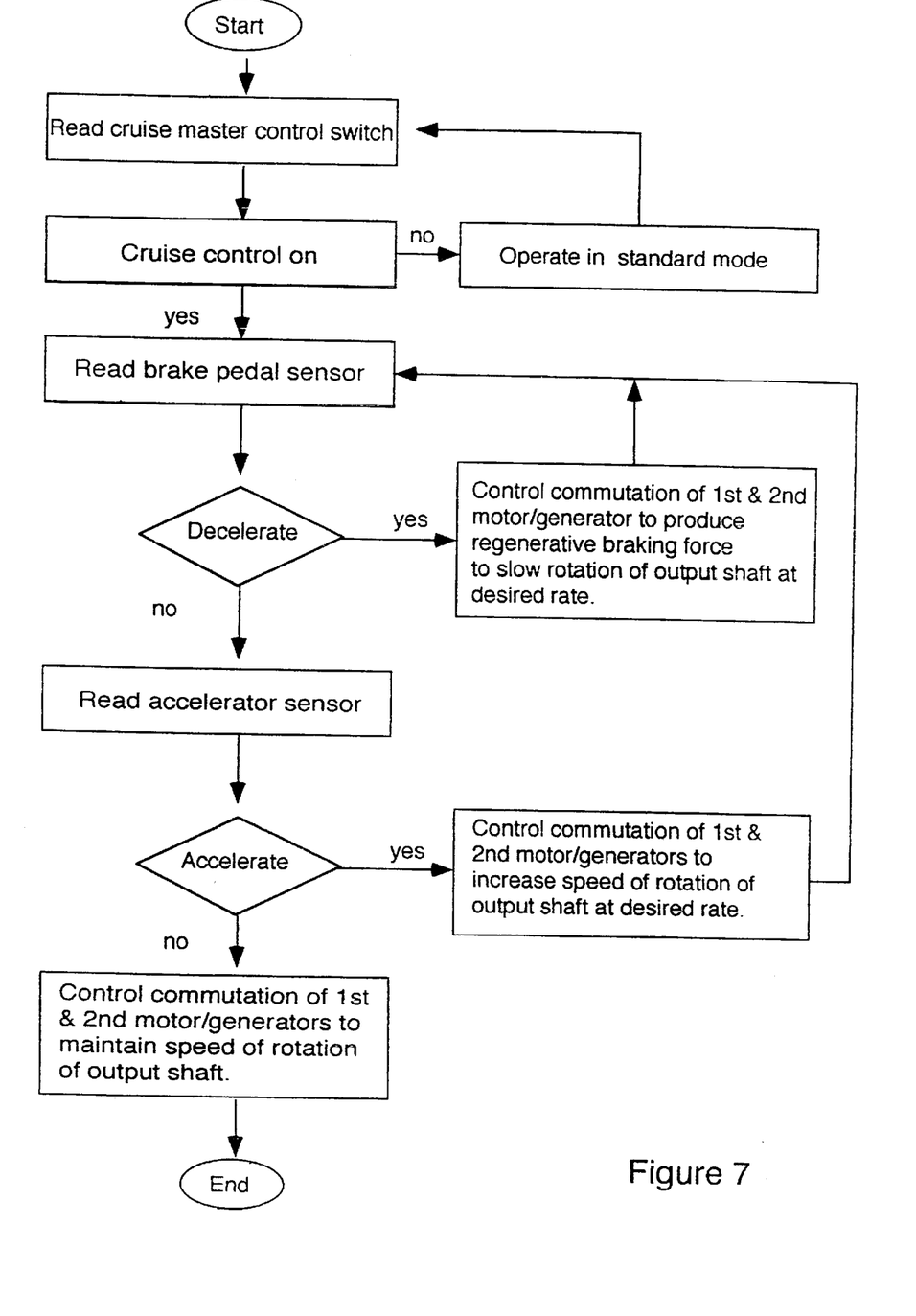
FIG. 7 is a flow chart illustrating the speed control portion of the operation.

Referring now to FIG. 7, the speed or "cruise" control feature is described. Microprocessor 26 determines whether the speed control switch is producing a "cruise control on" signal or a "cruise control off" signal. If the "cruise control on" signal is received, then the microprocessor determines the present speed and load on output shaft 62 by sensing the characteristics of the current flowing to the motor/generators 12,14. Such microprocessor determines whether the operator desires to accelerate, decelerate, or maintain the present speed by checking the signals from brake pedal and accelerator sensors 40,42. For example, the signal from brake pedal sensor 40 indicates whether the operator desires to slow the vehicle. The extent to which the brake pedal is depressed indicates the rate at which the operator desires to slow the vehicle. The actual rate of slowing the vehicle corresponding to a given position of the brake pedal is determined by reference to a look-up table in memory device 28.

The acceleration and deceleration characteristics incorporated in the look-up table are vehicle dependent and are a matter of designer choice depending upon desired performance characteristics of the vehicle. If the microprocessor 26 determines that neither the brake pedal nor the accelerator are depressed, the microprocessor 26 interprets this as meaning the operator desires to maintain the present speed of the vehicle. Alternatively, when neither the brake nor the accelerator are depressed, this is interpreted as an indication that the operator desires the vehicle to coast, perhaps gaining speed if traveling downhill, and perhaps losing speed if traveling on a flat surface or uphill.

If needed, a signal is sent by the microprocessor to the power controller 16 reflecting the desired rate of acceleration or deceleration. Power controller 16 changes the relative speeds of the first and second rotors 58,60 to provide the desired performance characteristics. As described above, this is accomplished by controlling the characteristics of the commutation of power flow to such motor/generators. Similarly, the magnitude of current is controlled such that the amount of torque applied to the output shaft 62 from each of the motor/generators is substantially equal to that applied to the other.

When hybrid electric vehicle drive system 10 is operating in the all-electric mode and microprocessor 26 determines that the operator wants to decelerate, microprocessor 26 causes first and second motor/generators 12,14 to produce regenerative braking forces by changing the phase of the switching in the power controller 16. Microprocessor 26 allows the first and second rotors 58,60 to increase to predetermined speeds to achieve a high back EMF for recharging the electric power storage device. Each rotor 58,60 is loaded by commutation in relationship to the signal produced by brake pedal sensor 40. When braking demand is greater than regenerative loading, the conventional friction brakes are also applied. Thus, only a first predetermined portion of travel of the brake pedal controls regenerative braking to the exclusion of conventional friction braking. Similarly, when microprocessor 26 determines that the present speed should be maintained but the load required to maintain that speed changes, e.g., the vehicle starts going up a hill, microprocessor 26 sends a signal to power controller 16 causing it to make the appropriate changes to the current flowing in the first and second motor/generators 12,14 to change the torque being applied to output shaft 62 such that the desired speed is maintained.

Speed Control: Recharge Mode

Relative to the operation of the speed control mode when operating in the recharge mode, in most situations, the heat engine 22 will be delivering a constant speed at a constant load and the rotational speed of the first rotor will be maintained. Only the speed of the second rotor will be changed by power controller 16 in response to desired changes of the velocity of output shaft 62.

The total torque from the combination of the first rotor 58 and the engine 22 varies depending on the generator load applied by the first motor/generator. If maximum vehicle acceleration is called for, the second motor/generator delivers maximum torque and the generator load produced by the first motor/generator is decreased to a point at which the torque applied to output shaft 62 by the combination of the first rotor 58 and engine 22 is substantially equal to the torque applied by second rotor 60.

Standard Operating Mode

Figure 8:
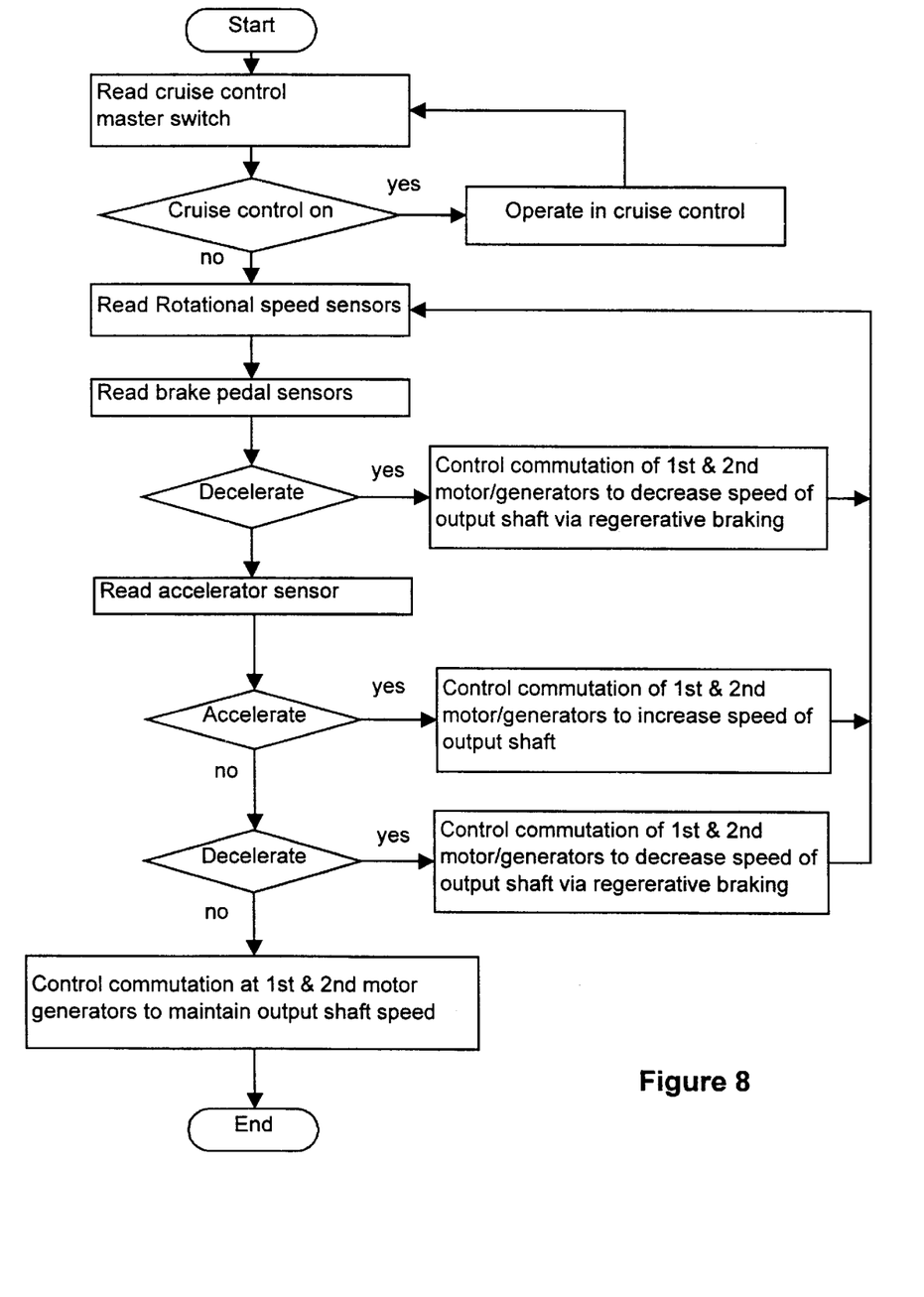
FIG. 8 is a logic flow chart illustrating a standard operation incorporated in an embodiment of the invention.

Referring now to FIG. 8, the standard operating mode is described. When speed control switch 36 delivers a "cruise control off" signal to microprocessor 26, microprocessor 26 determines from signals from brake pedal and accelerator sensors 40,42, whether the operator desires to increase or decrease the vehicle speed and, thus, the speed of output shaft 62. The relative speed and torque of first and second rotors 58,60 are controlled by power controller 16 to provide the desired speed and torque to output shaft 62 as described above.

This mode differs from the speed control mode in that microprocessor 26 determines acceleration and deceleration in response to changes in the position of the accelerator and/or the absolute position of the brake pedal; whereas in the speed control mode, the vehicle speed is directly determined in response to the position of the accelerator and brake pedal. For example, in one implementation, in the standard operating mode if the accelerator is depressed one-half of the way to the "floor" and is maintained in that position, then the current speed of output shaft 62 is maintained. However, if the accelerator is subsequently moved to be only depressed one-fourth, then microprocessor 26 uses a look-up table stored in memory device 28 to determine the rate at which the speed of the vehicle should be reduced. The rate of speed reduction is dependent upon the desired operating characteristics of the vehicle and can mimic the compression braking of a typical internal combustion engine driven vehicle. Acceleration is determined by using both the degree to which the accelerator is depressed and a look-up table stored in memory device 28 reflecting desired operational performance.

During operation of the system, regenerative braking is used when microprocessor 26 determines that braking is required. If the signal from brake pedal sensor 40 indicates that the brake pedal is depressed greater than a predetermined amount, for example in an emergency stopping situation, the vehicle's conventional braking system (not shown) applies the appropriate conventional braking force in addition to the regenerative braking.

The invention now being fully described, it will be apparent to one of ordinary skill in the art that many changes and modifications can be made without departing from the spirit or scope of the claims.

What is claimed is:

1. A drive system for a vehicle comprising the combination of:
    an output shaft for providing motive power to said vehicle;
    a first motor/generator coaxial with and in driving relationship to said output shaft;
    a second motor/generator coaxial with and in driving relationship to said output shaft;
    sensors positioned in the vehicle to sense the vehicle operator's desires relative to movement of the vehicle; and
    a controller for translating sensed changes into operation of each of said first and second motor/generators as a motor or as a generator.

2. The drive system of claim 1 further including a planetary gear arrangement connecting said motor/generators to one another and providing said driving relationship of each to said output shaft.

3. The drive system of claim 1 further including as part of said combination, an electrical energy storage device and said controller transfers electrical energy to said electrical storage device.

4. The drive system of claim 1 further including as part of the combination, a vehicle speed control master switch for producing a "cruise control on" signal and a "cruise control off" signal, and a speed controller for determining whether said operator desires to accelerate, decelerate or maintain the current rotational speed of said output shaft and responsively increase, decrease or maintain the difference between the rotational speeds of said first and second motor/generators.

5. The drive system of claim 1 further including as part of said combination, a heat engine having a drive shaft which also is coaxial with said output shaft.

6. A parallel hybrid electric driving arrangement which provides mechanical motion to a drive shaft comprising, in combination:
    (a) a source of electrical energy;
    (b) a pair of converters having rotors in a parallel relationship to one another for working together to change electrical energy obtained from said source to mechanical energy in the form of desired motion of said drive shaft, said rotors being coaxial with said drive shaft whereby a linear arrangement of converter rotors and drive shaft is provided;
    (c) a heat engine having an engine drive shaft which also is coaxial with said rotors, and
    (d) a processor responsive to the measurement of the speed of rotation of said output shaft for modifying the speeds of said rotors to assure that the speed of rotation of said output shaft is maintained at a desired speed.

7. The driving arrangement of claim 6 wherein both of said converters are also capable of changing mechanical energy into electrical energy, and said heat engine has an output shaft connected to the rotor of one of said converters to change mechanical energy provided by said heat engine to electrical energy.

8. A driving arrangement, comprising:
    a heat engine having a drive shaft;
    a first electric motor/generator having a first rotor connected to said drive shaft;
    a second electric motor/generator having a second rotor connected to and mounted coaxially with said first rotor;
    an output shaft connected to and between said first and second rotors;
    an electrical storage device;
    means for operating said driving arrangement in a recharge mode;
    means for determining the amount of torque and rotational speed required at the output shaft;
    means for producing electrical energy and transferring the produced electrical energy to said electrical storage device in response to said driving arrangement being in said recharge mode; and
    means for balancing the torque of said second motor/generator with the torque of the combination of said first motor/generator and said heat engine while maintaining the operation of said heat engine at a constant load and constant speed.

9. A driving arrangement, as set forth in claim 8, including means for controlling the speed of the output shaft and for maintaining the operation of said heat engine at the constant load and constant speed.

10. The driving arrangement of claim 6 wherein both of said converters include stators, and further including sensors for measuring the current flowing in said stators and a sensor positioned to measure the rotational speed of said drive shaft, all of said sensors being in communication with said processor to pass their respective measurements thereto.

11. The driving arrangement of claim 10 wherein said processor reacts to said measurements of said current flow and rotational speed of said drive shaft by operating said heat engine at a second constant speed and load when said engine reaches a predetermined low emission state.

12. The driving arrangement of claim 6, wherein both of said converters include first and second stators, respectively, and a processor is included which is programmed to maintain the currents flowing in said first and second stators at a constant ratio relative to each other.

13. The driving arrangement of claim 6 wherein said processor is programmed to cause rotation of said drive shaft in response to torque being delivered by both of said converters.

14. The driving arrangement of claim 6 wherein both of said converters have output shafts which are made to rotate to provide said mechanical energy and said drive shaft provides said mechanical motion as rotary motion of said drive shaft, further including, as part of said combination: a plurality of sensors positioned to measure the speed of rotation of said output and drive shafts; and a processor in communication with said sensors and responsive to the measurements provided thereby to modify the speed of rotation of said output shaft to be substantially equal to the speed of rotation of said drive shaft.

15. The driving arrangement of claim 1 wherein said controller is programmed to rotate said drive shaft at a rotational speed substantially proportional to the difference between the rotational speeds of said motor/generators.

16. A driving arrangement, comprising:

a heat engine having a drive shaft;

a first electric motor/generator having a first rotor connected to said drive shaft;

a second electric motor/generator having a second rotor;

an output shaft connected to and between said first and second rotors;

an electric storage device;

a sensor for determining the state of charge of said electric storage device;

sensors positioned to measure the relative speeds of said first rotor and said output shaft; and means for modifying the rotational speed of said first rotor to be substantially equal to the rotational speed of said engine drive shaft in response to the state of charge of said electric storage device being less than a predetermined constant.

17. A driving arrangement, as set forth in claim 16, including means for operating said heat engine at a first constant load and speed.

18. A driving arrangement, comprising:

a heat engine having a drive shaft;

a first electric motor/generator having a first rotor connected to said drive shaft;

a second electric motor/generator having a second rotor;

an output shaft connected to and between said first and second rotors;

means for determining the rotational speed of said output shaft;

means for determining a desired rotational speed of said output shaft; and means for modifying the rotational speed of said second rotor in response to changes in the rotational speed of said first rotor whereby the rotational speed of said output shaft is maintained at said desired rotational speed.

19. A driving arrangement, as set forth in claim 18, including means for operating said heat engine at a second constant speed and load in response to said heat engine reaching a low emissions operating state.

* * * * *

UNITED STATES PATENT AND TRADEMARK OFFICE
CERTIFICATE OF CORRECTION

PATENT NO. : 5,823,280
DATED : October 20, 1998
INVENTOR(S) : Lateur et al.

It is certified that error appears in the above-identified patent and that said Letters Patent is hereby corrected as shown below:

On the title page, item [73], delete this line in its entirety.

Signed and Sealed this

Twenty-ninth Day of June, 1999

Attest:

Q. TODD DICKINSON

*Attesting Officer*     *Acting Commissioner of Patents and Trademarks*